(12) United States Patent
Okamoto et al.

(10) Patent No.: US 11,533,419 B2
(45) Date of Patent: Dec. 20, 2022

(54) IMAGING APPARATUS, IMAGE SENSOR UNIT, CAMERA UNIT, AND CONTROL METHOD FOR DETERMINING AND UPDATING CORRECTION DATA

(71) Applicant: SONY CORPORATION, Tokyo (JP)

(72) Inventors: Keiichi Okamoto, Kanagawa (JP);
Masakazu Koyanagi, Kanagawa (JP);
Hidenori Kushida, Kanagawa (JP);
Keisuke Hirose, Tokyo (JP); Tomohiro Murakami, Chiba (JP); Tomotaka Ogura, Kanagawa (JP); Mitsuru Shibata, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/963,708

(22) PCT Filed: Nov. 30, 2018

(86) PCT No.: PCT/JP2018/044212
§ 371 (c)(1),
(2) Date: Jul. 21, 2020

(87) PCT Pub. No.: WO2019/150743
PCT Pub. Date: Aug. 8, 2019

(65) Prior Publication Data
US 2021/0099627 A1    Apr. 1, 2021

(30) Foreign Application Priority Data
Jan. 30, 2018 (JP) .............................. JP2018-013511

(51) Int. Cl.
*H04N 5/225* (2006.01)
*H04N 5/243* (2006.01)
*H04N 5/232* (2006.01)

(52) U.S. Cl.
CPC ........... *H04N 5/2258* (2013.01); *H04N 5/232* (2013.01); *H04N 5/243* (2013.01)

(58) Field of Classification Search
CPC ...... H04N 5/2258; H04N 5/232; H04N 5/243; H04N 5/2254; H04N 5/2251;
(Continued)

(56) References Cited

U.S. PATENT DOCUMENTS 5,713,053 A    1/1998 Hirai
7,983,557 B2 *  7/2011 Misawa ............. H04N 5/23203
                                              396/541
(Continued)

FOREIGN PATENT DOCUMENTS

CN    103037159 A    4/2013
EP    2 518 559 B1   10/2012
(Continued)

OTHER PUBLICATIONS

International Search Report dated Feb. 5, 2019 in PCT/JP2018/044212 (submitting English translation only), citing documents AR-AU therein, 2 pages.

*Primary Examiner* — Susan E. Torgerson
(74) *Attorney, Agent, or Firm* — Oblon, McClelland, Maier & Neustadt, L.L.P.

(57) ABSTRACT

An imaging apparatus including: an image sensor unit; and a camera unit from which the image sensor unit is detachable, in which the image sensor unit includes at least an image sensor and a first storage unit in which first correction data are stored, the camera unit includes at least a control unit, and the control unit performs an update determination process for determining whether or not the first correction data stored in the first storage unit have been updated.

19 Claims, 6 Drawing Sheets

(58) Field of Classification Search
CPC ......... H04N 2005/2255; H04N 5/2176; H04N 5/23209; H04N 5/23227; H04N 5/23225
USPC .......................................................... 348/46
See application file for complete search history.

(56) References Cited

U.S. PATENT DOCUMENTS

| | | | |
|---|---|---|---|
| 2005/0058151 | A1 | 3/2005 | Yeh |
| 2011/0145804 | A1* | 6/2011 | Oka .................... H04N 5/23209 717/168 |
| 2013/0235261 | A1* | 9/2013 | Berkner ............. H04N 5/22541 348/374 |
| 2013/0308933 | A1* | 11/2013 | Uchiyama ........ H04N 5/232122 396/125 |
| 2017/0180638 | A1* | 6/2017 | Saito .................. H04N 5/23225 |
| 2017/0235214 | A1* | 8/2017 | Seki ....................... G03B 17/14 396/529 |
| 2018/0224722 | A1* | 8/2018 | Pan ........................ G03B 17/14 |

FOREIGN PATENT DOCUMENTS

| | | | |
|---|---|---|---|
| JP | 2007-235725 | A | 9/2007 |
| JP | 2007295311 | A | 11/2007 |
| JP | 2008-10939 | A | 1/2008 |
| JP | 2008010939 | A * | 1/2008 |
| JP | 2010-204430 | A | 9/2010 |
| JP | 2010-237515 | A | 10/2010 |
| WO | WO 2017/006889 | A1 | 1/2017 |
| WO | WO 2017/070487 | A1 | 4/2017 |
| WO | WO-2017068894 | A1 | 4/2017 |

\* cited by examiner

IMAGING APPARATUS, IMAGE SENSOR UNIT, CAMERA UNIT, AND CONTROL METHOD FOR DETERMINING AND UPDATING CORRECTION DATA

TECHNICAL FIELD

The present disclosure relates to an imaging apparatus, an image sensor unit, a camera unit, and a control method.

BACKGROUND ART

There has been proposed a technique in which an imaging block including a lens and an image sensor is attachable to and detachable from the main body side of an imaging apparatus (refer to, for example, Patent Document 1). A video camera described in Patent Document 1 stores correction data and the like related to an image sensor in an electrically erasable programmable read-only memory (EEPROM) of an imaging block, and performs a setup of each circuit on the imaging apparatus side by using the correction data.

CITATION LIST

Patent Document

Patent Document 1: WO 96/11548

SUMMARY OF THE INVENTION

Problems to be Solved by the Invention

The correction data described in Patent Document 1 may be appropriately updated according to a secular change and the like. The video camera described in Patent Document 1 has a problem in that it is not possible to determine whether or not such correction data have been updated.

One of objects of the present disclosure is to provide, for example, an imaging apparatus in which whether or not correction data have been updated can be determined on the main body side of the imaging apparatus, an image sensor unit, a camera unit, and a control method.

Solutions to Problems

The present disclosure is, for example, an imaging apparatus including:

an image sensor unit; and a camera unit from which the image sensor unit is detachable, in which the image sensor unit includes at least:

an image sensor; and a first storage unit in which first correction data are stored, the camera unit includes at least a control unit, and the control unit performs an update determination process for determining whether or not the first correction data stored in the first storage unit have been updated.

The present disclosure is, for example, an image sensor unit to which a lens unit including an imaging lens can be attached in a detachable manner, the image sensor unit being attachable to and detachable from a camera unit, the image sensor unit including at least:

an image sensor; and a storage unit in which correction data are stored, in which data representing an update history of the correction data are stored in the storage unit.

The present disclosure is, for example, a camera unit to which an image sensor unit and a lens unit can be attached in a detachable manner, the image sensor unit including at least an image sensor and a storage unit in which correction data are stored, the lens unit including an imaging lens, the lens unit being attachable to and detachable from the camera unit via the image sensor unit, the camera unit including:

a control unit that determines whether or not correction data have been updated, the correction data being stored in a storage unit included in an image sensor unit attached to the camera unit.

The present disclosure is, for example, a control method including:

causing a control unit included in a camera unit to determine whether or not correction data have been updated, the correction data being stored in a first storage unit included in an image sensor unit attached to the camera unit, and to store the correction data in a second storage unit included in the camera unit in a case where the correction data have been updated, as a result of the determination.

Effects of the Invention

According to at least an embodiment of the present disclosure, whether or not correction data have been updated can be determined on the main body side of an imaging apparatus. Note that effects described here are not necessarily restrictive, and any of the effects described in the present disclosure may be achieved. Furthermore, the contents of the present disclosure are not construed as being limited by the illustrated effects.

MODE FOR CARRYING OUT THE INVENTION

Hereinafter, an embodiment and the like of the present disclosure will be described with reference to the drawings. Note that description will be provided in the following order.

<1. One Embodiment>
<2. Variations>
<3. Application Examples>

The embodiment and the like to be described below are preferred specific examples of the present disclosure, and the contents of the present disclosure are not limited to the embodiment and the like.

1. One Embodiment

[Configuration Example of Imaging Apparatus]

Figure 1:
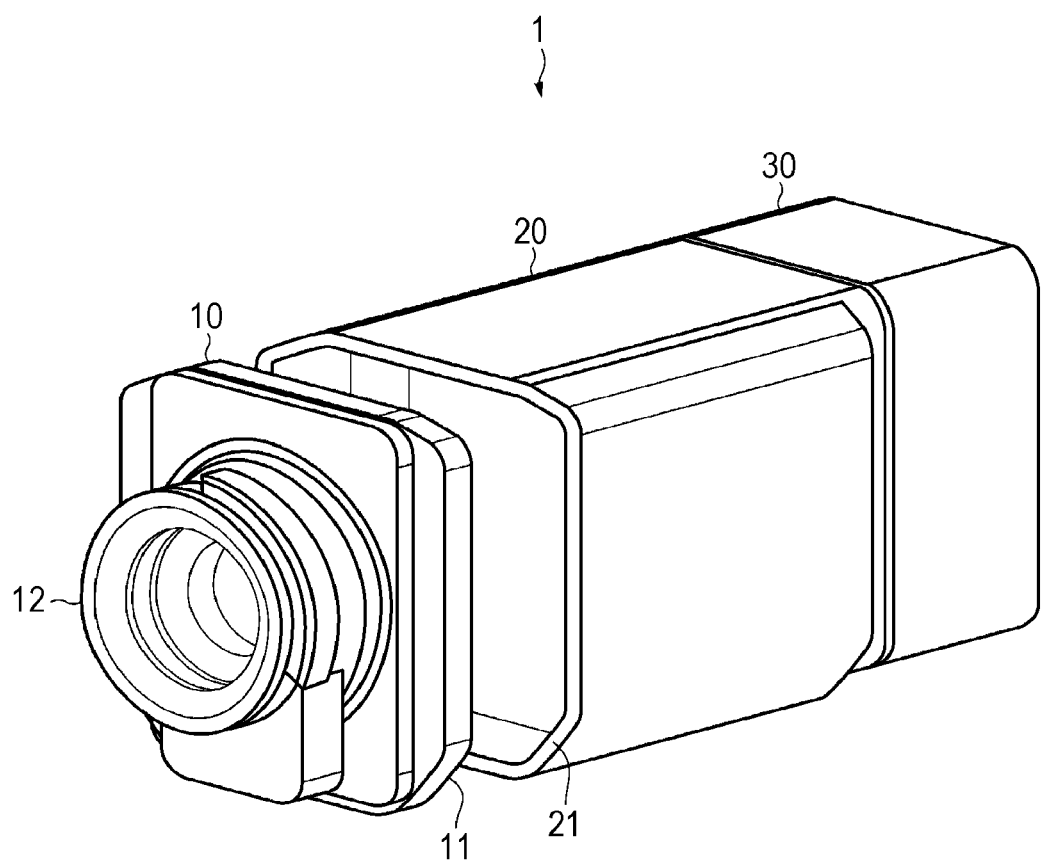
FIG. 1 is an exploded perspective view of an imaging apparatus according to one embodiment, for describing a configuration example thereof.

FIG. 1 is a partially exploded perspective view of an imaging apparatus (imaging apparatus 1) according to one embodiment, for describing a configuration example thereof. The imaging apparatus 1 includes an image sensor unit 10, a camera unit 20, and a storing unit 30. The image sensor unit 10 includes an image sensor. The camera unit 20 has a box shape, and processes image data output from the image sensor. The storing unit 30 includes a hard disk, a semiconductor memory, and the like (including a drive part that reads image data therefrom and writes image data thereto).

The image sensor unit 10 is detachable from the camera unit 20. For example, the image sensor unit 10 includes an attachment plate 11 with a rectangular shape. Portions near the four corners of the attachment plate 11 are screwed onto an attachment surface 21 of the camera unit 20, with screws put into screw holes provided in the attachment surface 21 facing the attachment plate 11. Thus, the image sensor unit 10 is attached to the camera unit 20. The image sensor unit 10 can be attached to and detached from the camera unit 20 not only by the service center but also by a user of the imaging apparatus 1. Note that the image sensor unit 10 may also be referred to as an optical head block (OHB) in some cases.

As described above, the imaging apparatus 1 according to the present embodiment is configured such that the image sensor unit 10 is attached to the camera unit 20 in a replaceable manner. In other words, a different image sensor unit 10 can be attached to the camera unit 20. Respective image sensors included in the image sensor units 10 are different in characteristics. The respective image sensors included in the image sensor units 10 are different in, for example, number of pixels (sometimes defined by the size of the image sensor), performance of peripheral circuits, and the like. Therefore, it is possible to use an appropriate image sensor according to an imaging purpose, an imaging environment, and the like, by switching the image sensor units 10 to be attached to the camera unit 20.

The storing unit 30 is detachable from the other side surface of the camera unit 20. Image data corresponding to an image (either a still image or a moving image) captured by the imaging apparatus 1 are stored in the storing unit 30. Note that the image data may also be stored in, for example, a storage unit included in the camera unit 20, and the imaging apparatus 1 may be configured such that the imaging apparatus 1 includes no storing unit 30.

A lens mount 12 is provided on a main surface of the image sensor unit 10, located on a side opposite to the camera unit 20 side. A lens unit (not shown in FIG. 1) including an imaging lens is attachable to and detachable from the lens mount 12. Different lens units are attachable to and detachable from the image sensor unit 10. That is, the camera unit 20 has a configuration in which the lens unit is attachable to and detachable from the camera unit 20 via the image sensor unit 10. It is possible to use an appropriate imaging lens according to an imaging purpose, an imaging environment, and the like, by switching the lens units to be attached to the image sensor unit 10.

For example, when the image sensor unit 10, the camera unit 20, the storing unit 30, and the lens unit are physically connected to each other, an electrical connection is established. This enables transmission and reception of data, commands, and the like between the units via a connector or a predetermined signal line. Note that power may be supplied from, for example, a power supply unit (for example, a lithium-ion secondary battery) included in the camera unit 20 to the image sensor unit 10 and the lens unit via a predetermined power line.

[Internal Configuration Example of Imaging Apparatus]

Figure 2:
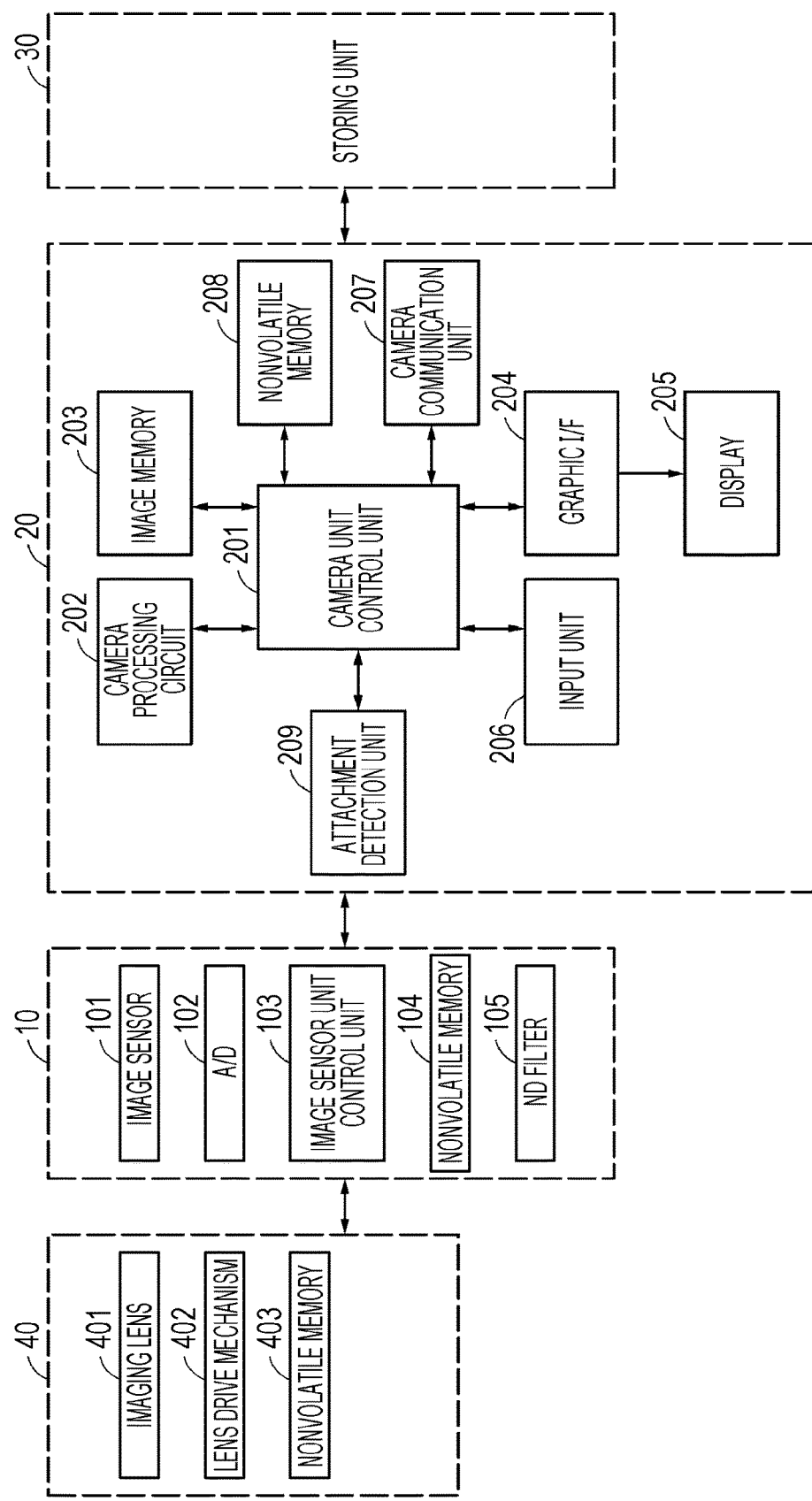
FIG. 2 is a block diagram for describing the configuration example of the imaging apparatus according to the one embodiment.

FIG. 2 is a block diagram showing an example of the internal configuration of the imaging apparatus 1. As described above, the imaging apparatus 1 includes the image sensor unit 10, the camera unit 20, the storing unit 30, and the lens unit (lens unit 40).

(Internal Configuration Example of Image Sensor Unit)

The image sensor unit 10 includes, for example, an image sensor 101, an analog (A)/digital (D) conversion unit 102, an image sensor unit control unit 103, a nonvolatile memory 104, and a neutral density (ND) filter 105. Correction data are stored in the nonvolatile memory 104, which is an example of a first storage unit.

The image sensor 101 includes a charge coupled device (CCD), a complementary metal oxide semiconductor (CMOS), or the like. The image sensor 101 performs photoelectric conversion of subject light incident through the lens unit 40 to convert the light into an electric charge amount, and thus generates an image. The image sensor 101 may include a pixel for detecting a phase difference in addition to a normal pixel.

The A/D conversion unit 102 converts the output of the image sensor 101 into a digital signal, and outputs the digital signal. The A/D conversion unit 102 simultaneously converts, for example, pixel signals for a single line into digital signals. Note that the image sensor unit 10 may include a memory that temporarily holds the output of the A/D conversion unit 102. Image data converted into digital signals by the A/D conversion unit 102 are supplied to the camera unit 20.

The image sensor unit control unit 103 controls each unit of the image sensor unit 10. The image sensor unit control unit 103 according to the present embodiment performs control relating to the ND filter 105. More specifically, the image sensor unit control unit 103 performs control for switching a plurality of types of ND filters in a case where the plurality of types of ND filters is applied, and also performs control regarding whether or not the ND filter is used. Note that the image sensor unit control unit 103 is capable of bidirectional communication with a control unit included in the camera unit 20, to be described later.

For example, a flash memory including a Serial Peripheral Interface (SPI) can be applied as the nonvolatile memory 104. Of course, a nonvolatile memory with a different configuration may be applied as the nonvolatile memory 104. The nonvolatile memory 104 includes a read/write unit that writes data to the nonvolatile memory 104 and reads data from the nonvolatile memory 104.

Correction data are stored in the nonvolatile memory 104 according to the present embodiment. The correction data stored in the nonvolatile memory 104 are updated under the control of the control unit included in the camera unit 20, to be described later. Note that details of the correction data will be described later.

The ND filter 105 is an optical filter that uniformly dims light without wavelength selectivity in the visible range. The ND filter 105 may include a single type of ND filter, or may include a plurality of types of ND filters.

(Internal Configuration Example of Camera Unit)

Next, an example of the internal configuration of the camera unit 20 will be described. The camera unit 20 includes, for example, a camera unit control unit 201, a camera processing circuit 202, an image memory 203, a graphic interface (I/F) 204, a display 205, an input unit 206, a camera communication unit 207, a nonvolatile memory 208, and an attachment detection unit 209. The camera unit control unit 201 is an example of the control unit. The nonvolatile memory 208 is an example of a second storage unit.

The camera unit control unit 201 includes, for example, a central processing unit (CPU), and controls each unit of the camera unit 20. The camera unit control unit 201 includes a read only memory (ROM), a random access memory (RAM), and the like (note that illustration of these constituent elements has been omitted). A program is stored in the ROM. The RAM is used as a working memory when the program is executed. The camera unit control unit 201 performs a plurality of determination processes including, for example, an update determination process for determining whether or not correction data stored in the nonvolatile memory 104 have been updated.

The camera processing circuit 202 performs signal processing on image data supplied in a digital format from the A/D conversion unit 102 of the image sensor unit 10. Examples of the signal processing include white balance adjustment processing, color correction processing, gamma correction processing, Y/C conversion processing, auto-exposure (AE) processing, white/black shading, defect correction, and the like. Note that correction data to be set at the time of white/black shading, defect correction, and the like will be described later.

The image memory 203 is a buffer memory including a volatile memory such as a dynamic random access memory (DRAM), in which image data subjected to predetermined processing performed by the camera processing circuit 202 are temporarily stored.

The graphic I/F 204 generates image data to be displayed on the display 205, from a data signal supplied from the camera unit control unit 201, and supplies the image data to the display 205 to cause the display 205 to display an image. The display 205 displays a through image being captured and images stored in the nonvolatile memory 208, the storing unit 30, and the like. Furthermore, the display 205 displays a menu screen and a screen for performing various settings, such as a screen for changing correction data.

The display 205 includes a liquid crystal display (LCD), an organic electroluminescence (EL) display, or the like. Note that the display 205 may be connected to the camera unit 20 through a wired connection or a wireless connection.

The input unit 206 collectively refers to constituent elements that receive input operations, such as a power button for switching between power-on and power-off, a recording start button (REC button) for providing an instruction for starting the recording of a moving image, a button for capturing a still image, an operator for zoom adjustment, a touch screen integrally formed with the display 205, and a button for a graphical user interface (GUI) operation to be displayed on a display provided inside or outside the camera unit 20, for example. Note that these input units are merely examples, and are not essential constituent elements. When an input is made to the input unit 206, a control signal corresponding to the input is generated and output to the camera unit control unit 201. Then, the camera unit control unit 201 performs arithmetic processing and control corresponding to the control signal.

The camera communication unit 207 is a constituent element to be used by the imaging apparatus 1 to communicate with another apparatus, and has functions necessary for communication, such as an antenna function and a modulation/demodulation function.

For example, a flash memory including an SPI interface can be applied as the nonvolatile memory 208. Of course, a nonvolatile memory with a different configuration may be applied as the nonvolatile memory 208. The nonvolatile memory 208 includes a read/write unit that writes data to the nonvolatile memory 208 and reads data from the nonvolatile memory 208. Correction data are stored in the nonvolatile memory 208 according to the present embodiment. The correction data are set in corresponding hardware (for example, the camera processing circuit 202) under the control of the camera unit control unit 201.

The attachment detection unit 209 detects attachment of the image sensor unit 10 to the camera unit 20 in terms of hardware. The attachment detection unit 209 has a hole into which a physical pin can be inserted. The image sensor unit 10 includes a pin that can be inserted into the hole. In the present embodiment, each of the pin and the hole corresponds to a connection part.

For example, in a case where the image sensor unit 10 is not attached, the level of a signal to be supplied from the attachment detection unit 209 is set to low (for example, 0 V (volt)). Furthermore, in a case where the pin included in the image sensor unit 10 has been inserted in the hole, the level of the signal to be supplied from the attachment detection unit 209 is set to high (for example, 5 V). The camera unit control unit 201 detects whether or not the image sensor unit 10 has been attached, by detecting a change in the signal level.

Note that the model of the image sensor unit 10 may be determined on the basis of the presence or absence of a specific hard pin of the image sensor unit 10. The start-up process of the control circuit configuration of the camera unit control unit 201, an FPGA (not shown), or the like may be performed in accordance with the result of determination, and these processes may be performed in parallel with the start-up process of FIG. 3 to be described later. Furthermore, the image sensor unit 10 and the camera unit 20 may be connected by a cable or the like including corresponding connection parts, instead of being directly connected.

(Configuration Example of Storing Unit)

The storing unit 30 includes a storage unit, such as a hard disk, and a read/write unit (note that illustration of these constituent elements has been omitted). The read/write unit has the function of writing image data and the like to the storage unit and the function of reading image data and the like from the storage unit.

(Configuration Example of Lens Unit)

The lens unit 40 includes, for example, an imaging lens 401, a lens drive mechanism 402, and a nonvolatile memory 403. The imaging lens 401 is a lens for condensing light from a subject on the image sensor 101, and generally includes a plurality of lenses.

The lens drive mechanism 402 includes a mechanism for moving a focus lens to perform focus adjustment, a shutter mechanism, an iris mechanism, and the like. The lens drive mechanism 402 is driven on the basis of a control signal transmitted from the camera unit control unit 201 via a predetermined signal line. For example, the lens drive mechanism 402 implements AF operation by moving the imaging lens 401 along an optical axis direction according to a control signal supplied from the camera unit control unit 201. Note that at least a part of the lens drive mechanism 402 may be included in the camera unit 20. For example, the shutter mechanism may be included not in the lens drive mechanism 402 but in the image sensor unit 10. Note that the shutter mechanism is not a constituent element essential for the lens drive mechanism 402.

Data representing lens information regarding the imaging lens 401, and the like are stored in the nonvolatile memory 403. The lens information on the imaging lens 401 contains, for example, a lens name, a focal length, an f-number, and the like. Data representing the lens information on the imaging lens 401, and the like are transmitted from the lens unit 40 to the image sensor unit 10 via a predetermined signal line, and further transmitted from the image sensor unit 10 to the camera unit 20. That is, the lens information regarding the imaging lens 401 is supplied to the camera unit 20 via the image sensor unit 10. Note that the lens information regarding the imaging lens 401 may be directly supplied to the camera unit 20 without involving the image sensor unit 10 by, for example, short-range wireless communication.

[Basic Operation Example of Imaging Apparatus]

Here, a basic operation in the above-described imaging apparatus 1 will be schematically described. The image sensor unit 10, the storing unit 30, and the lens unit 40 are attached to the camera unit 20. Note that the camera unit 20 may be configured such that the power to the camera unit 20 is not turned on in a case where, for example, the image sensor unit 10 is not attached to the camera unit 20.

Before an image is captured, signals obtained as a result of photoelectric conversion of light received by the image sensor 101 are sequentially supplied to the camera processing circuit 202. The camera processing circuit 202 performs image quality correction processing on supplied image data, and supplies, as a signal of a through image, the processed image data to the graphic I/F 204 via the camera unit control unit 201. As a result, the through image is displayed on the display 205. A user views the through image displayed on the display 205 and checks an imaging target.

In this state, the capturing of a moving image is started when the REC button of the input unit 206 is pressed. Accordingly, image data output from the image sensor 101 at a predetermined frame rate are converted into image data in a digital format by the A/D conversion unit 102.

The camera processing circuit 202 performs image processing on the image data supplied from the image sensor 101, and supplies the processed image data to the camera unit control unit 201. The camera unit control unit 201 performs control such that the input image data are compressed and encoded and the generated encoded data are stored in, for example, the nonvolatile memory 208. Thus, a moving image is captured. Note that in the case of a still image, the camera processing circuit 202 performs image processing on image data corresponding to, for example, a single frame output in response to an operation performed on a release button. It is also possible to capture a still image by pressing a shutter button while capturing a moving image. Of course, a still image need not necessarily be captured while a moving image is being captured.

Meanwhile, in a case where an image file stored in the nonvolatile memory 208 is played, the camera unit control unit 201 reads a selected still image file from the nonvolatile memory 208 according to an operation input from the input unit 206. Decompression and decoding processing is performed on the read image data. Then, the decoded image data are supplied to the graphic I/F 204 via the camera unit control unit 201. As a result, a still image or a moving image stored in the nonvolatile memory 208 is displayed on the display 205. Note that image data may be written to the storing unit 30, or image data stored in the storing unit 30 may be reproduced.

[Example of Correction Data]

Next, correction data will be described. Various data including correction data are written into the nonvolatile memory 104 included in the image sensor unit 10 when, for example, the image sensor unit 10 is shipped.

The correction data include data expected to be updated later (updatable correction data) and data that basically do not need to be updated. When reading correction data, the camera unit 20 basically reads both types of correction data. However, only the updatable correction data can be updated on the camera unit 20 side.

Specific examples of the updatable correction data include pixel defect information, white shading correction information, black shading correction information, data relating to the failure of the ND filter 105, and the amount of deviation of the image sensor 101 from the optical axis. In addition, examples of the data that basically do not need to be updated include the sensitivity of the image sensor 101, flare correction information, and the color correction information for each ND filter 105.

Note that the data relating to the failure of the ND filter 105 refer to information for forcibly turning off the use of the ND filter 105 in a case where, for example, a failure occurs in a filter disk unit that switches insertion of the ND filter 105. These pieces of correction data are set in corresponding hardware (specifically exemplified by a shading correction circuit included in the camera processing circuit 202).

[Examples of Use of Imaging Apparatus]

The imaging apparatus 1 described above can replace the image sensor unit 10 or the lens unit 40 to be attached to the camera unit 20 with another and capture an image. Therefore, it is possible to capture an image by using an image sensor and an imaging lens suitable for an imaging environment, imaging conditions, an imaging target, and the like. Moreover, even in a case where a user does not have the image sensor unit 10 or the lens unit 40, it is also possible to borrow the image sensor unit 10 or the lens unit 40 owned by a company or a friend and capture an image.

Incidentally, the above-described correction data are optimized at the time of shipment, but may not be appropriate depending on a secular change, the environment of usage of the image sensor unit 10, and the like. Of course, it is also conceivable that a user may bring the image sensor unit 10 to the service center and update correction data in the nonvolatile memory 104 in the image sensor unit 10 with appropriate data. However, for a user (for example, a user who is familiar with the settings for imaging), it is preferable that the user can update correction data with appropriate values by oneself, from a viewpoint of convenience. Therefore, in the present embodiment, correction data stored in the nonvolatile memory 104 of the image sensor unit 10 can be updated under the control of the camera unit control unit 201 of the camera unit 20.

For example, an image sensor unit 10 is attached to the camera unit 20. A user captures an image in a state where light is blocked by a light-shielding filter, and obtains image data. An image corresponding to the image data is displayed on the display 205. The user checks a position where a defective pixel exists, on the basis of the image displayed on the display 205, and specifies the position (address) thereof by using the input unit 206. An operation signal corresponding to an operation performed on the input unit 206 is supplied to the camera unit control unit 201. The camera unit control unit 201 updates correction data (in the present example, pixel defect information on the image sensor 101) stored in the nonvolatile memory 104 such that the correction data indicate that the defective pixel exists at the address corresponding to the operation signal.

As described above, although convenience is improved as a result of allowing a user to update correction data, the camera unit 20 cannot determine whether or not correction data stored in the image sensor unit 10 have been updated. Description will be provided on the basis of a specific example. For example, an image sensor unit 10A is attached to a camera unit 20A, and correction data stored in the image sensor unit 10A are stored (copied) in a nonvolatile memory 208A of the camera unit 20A. Then, an image is captured in a state where the correction data are set in hardware of the camera unit 20A.

Then, it is assumed that the image sensor unit 10A is attached to a camera unit 20B and used on another occasion. At this time, it is assumed that the correction data stored in the image sensor unit 10A are updated in response to an operation performed on the camera unit 20B. Thereafter, it is assumed that the image sensor unit 10A is attached to the camera unit 20A and used again on another occasion. In this case, the camera unit 20A cannot determine whether or not the correction data stored in the image sensor unit 10A have been updated. Thus, the camera unit 20A cannot determine whether or not the correction data should be set in its own hardware.

Assuming that the correction data stored in the image sensor unit 10A are constantly kept up-to-date, it is also conceivable that the camera unit 20A may constantly set, in the hardware, the correction data stored in the image sensor unit 10A. However, under such control, the camera unit 20A should constantly read the correction data stored in the image sensor unit 10A and set the correction data in the hardware. Thus, processing (for example, the start-up process of the imaging apparatus 1) requires time. On the basis of such points, an example of a process to be performed in the one embodiment will be described.

[Process to Be Performed in One Embodiment]

Figure 3:
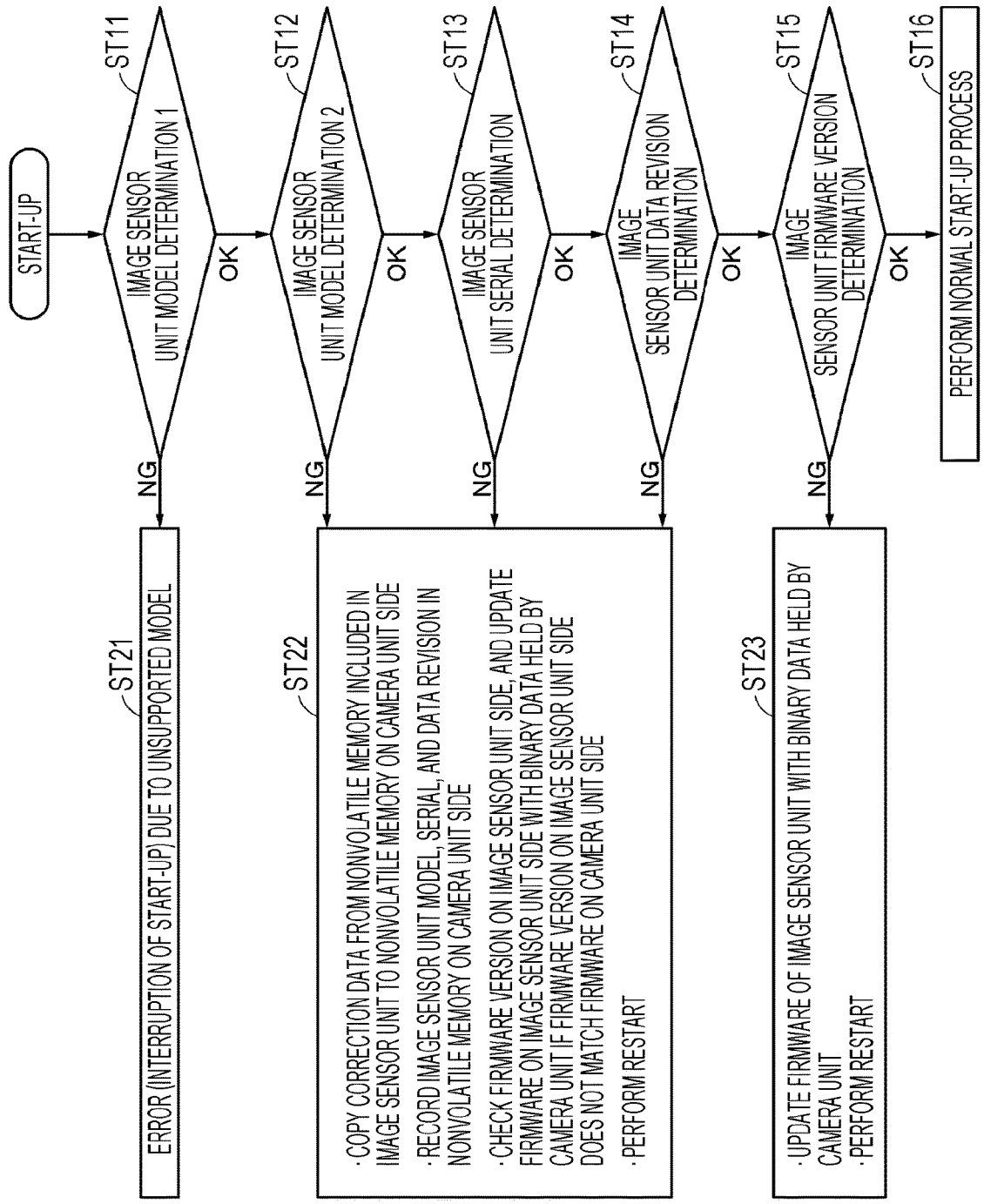
FIG. 3 is a flowchart showing the flow of a process to be performed in the imaging apparatus according to the one embodiment.

FIG. 3 is a flowchart showing the flow of a process to be performed by, for example, the camera unit control unit 201 in the present embodiment. The process to be described below is, for example, a process to be performed when the imaging apparatus 1 is started (when power is turned on). Note that the imaging apparatus 1 is configured, in the present embodiment, such that the power to the camera unit 20 is not turned on in a case where the image sensor unit 10 is not attached to the camera unit 20 (in a case where attachment of the image sensor unit 10 is not detected in terms of hardware).

(Example of Information to Be Used in Determination Process)

Note that contents of information (hereinafter, referred to as determination information as appropriate) to be used for each determination process to be described below are as follows.

"Model information on image sensor unit" . . . a unique identifier (model identifier (ID)) to be assigned to each model of image sensor units.

"Serial number of image sensor unit" . . . a unique serial number to be individually assigned to each image sensor unit. When the image sensor unit 10 is manufactured, the information is written to the nonvolatile memory 104.

"Data revision number of image sensor unit" . . . information indicating an update history of correction data. In a case where correction data are updated, this number is incremented (+1). In order to detect update of correction data even for the same image sensor unit 10, the data revision number is also updated when the correction data are updated. In the present embodiment, a single data revision number is assigned to the correction data.

"Firmware version of image sensor unit" . . . version information (version name) of firmware for controlling the ND filter mounted on the image sensor unit 10. With regard to firmware for controlling the ND filter, firmware binary is held in the nonvolatile memory 208 of the camera unit 20 so as to cause the firmware identical in version to firmware of the camera unit 20 to operate. Then, when a different version of firmware for controlling the ND filter is detected, the firmware stored in the nonvolatile memory 208 is updated on the basis of the detected firmware.

Note that respective data corresponding to the model information on the image sensor unit and the serial number of the image sensor unit are examples of data related to the image sensor unit.

Data corresponding to these pieces of determination information are stored in each of the nonvolatile memory 104 of the image sensor unit 10 and the nonvolatile memory 208 of the camera unit 20. Data corresponding to the latest determination information, that is, determination information corresponding to the previously attached image sensor unit 10 is stored in the nonvolatile memory 208 of the camera unit 20.

(Flow of Processing)

The flow of processing will be described. In step ST11, the camera unit control unit 201 makes a determination regarding the model of the image sensor unit 10 (image sensor unit model determination 1). In this processing, the camera unit control unit 201 acquires model information on the currently attached image sensor unit 10, and determines whether or not the model information is included in model information on models that the camera unit 20 can support. Here, in a case where the model information on the image sensor unit 10 is not included in the model information on the models that the camera unit 20 can support (in the case of NG (in a case where the determination condition is not satisfied)), the process proceeds to step ST21.

In step ST21, since the attached image sensor unit 10 corresponds to a model (unsupported model) that the camera unit 20 does not support, error processing is performed, and the start-up process is interrupted. Note that the error processing is, for example, processing for providing display or sound to notify the user that the attached image sensor unit 10 corresponds to a model that the camera unit 20 does not support.

In the determination process of step ST11, in a case where the model information on the image sensor unit 10 is included in the model information on the models that the camera unit 20 can support (in the case of OK (in a case where the determination condition is satisfied)), the process proceeds to step ST12.

In step ST12, the camera unit control unit 201 compares the model information on the image sensor unit 10 stored in the nonvolatile memory 208 with the model information on the image sensor unit 10 stored in the nonvolatile memory 104 (image sensor unit model determination 2). As a result of performing such processing, it is determined whether or not the model of the currently attached image sensor unit 10 is the same as the model of the image sensor unit 10 previously attached to the camera unit 20. In a case where the model information matches each other (in the case of OK) as a result of the comparison, the process proceeds to step ST13.

In step ST13, the camera unit control unit 201 compares the serial number of the previously used image sensor unit 10 stored in the nonvolatile memory 208 with the serial number of the image sensor unit 10 stored in the nonvolatile memory 104 (image sensor unit serial determination). As a result of performing such processing, it is determined whether or not the currently attached image sensor unit 10 is the same as the image sensor unit 10 previously attached to the camera unit 20. In a case where the serial numbers match each other (in the case of OK) as a result of the comparison, it is determined that the currently attached image sensor unit 10 is the same as the previously attached image sensor unit, and the process proceeds to step ST14.

In step ST14, the camera unit control unit 201 compares the data revision number of the previously used image sensor unit 10 stored in the nonvolatile memory 208 with the data revision number of the image sensor unit 10 stored in the nonvolatile memory 104 (image sensor unit revision determination). There is performed such an update determination process, that is, a process of determining whether or not correction data (an example of first correction data) stored in the image sensor unit 10 have been updated. Thus, even in a case where the currently attached image sensor unit 10 is the same as the image sensor unit 10 previously attached to the camera unit 20, it is possible to determine whether or not the correction data stored in the nonvolatile memory 104 of the image sensor unit 10 have been updated, by performing the update determination process. As a result of the comparison, in a case where the data revision numbers match each other (in the case of OK), it is determined that the correction data are identical (not updated), and the process proceeds to step ST15.

In step ST15, the camera unit control unit 201 compares firmware version information (second version information) on the previously used image sensor unit 10 stored in the nonvolatile memory 208 with firmware version information (first version information) on the image sensor unit 10 stored in the nonvolatile memory 104 (image sensor unit firmware version determination). As a result of the comparison, in a case where the firmware version information (hereinafter, referred to as firmware version as appropriate) matches each other (or the firmware stored in the image sensor unit 10 corresponds to the firmware stored in the camera unit 20), the process proceeds to step ST16.

In step ST16, since the correction data stored in the nonvolatile memory 104 of the attached image sensor unit 10 are the same as the correction data stored in the nonvolatile memory 208 of the camera unit 20, a normal start-up process is performed. In the normal start-up process, the camera unit control unit 201 sets, in hardware, the correction data stored in the nonvolatile memory 208, and performs processing by using the correction data. The camera unit control unit 201 sets the correction data stored in its own unit (the camera unit 20 in the present example), instead of correction data stored in another unit (the image sensor unit 10 in the present example). Thus, the time required for processing can be reduced, and a processing load can also be reduced.

In a case where the data revision numbers do not match each other (in the case of NG) in the update determination process performed in step ST14, the camera unit control unit 201 determines that the correction data stored in the nonvolatile memory 104 of the image sensor unit 10 have been updated, and the process proceeds to step ST22. Furthermore, in a case where the determination condition is not satisfied (in the case of NG) in one of the plurality of determination processes (the determination processes of steps ST12 and ST13 in the present example) different from the update determination process, the camera unit control unit 201 determines that the currently attached image sensor unit 10 is different from the previously attached image sensor unit 10. The process proceeds to step ST22 also in this case.

In step ST22, for example, the following processing is performed.

The camera unit control unit 201 stores (copies), in the nonvolatile memory 208, correction data read from the nonvolatile memory 104 included in the image sensor unit 10. Thereafter, processing is performed by use of the correction data stored at this time.

The camera unit control unit 201 stores (copies), in the nonvolatile memory 208, the determination information stored in the nonvolatile memory 104 (in the present embodiment, the model information on the image sensor unit 10, the serial number of the image sensor unit 10, and the data revision number of the image sensor unit 10 stored in the nonvolatile memory 104). As a result, the correction data and the determination information stored in the currently attached image sensor unit 10 are copied to the camera unit 20 side, and thus the correction data and the determination information are shared.

After the above processing is completed, the camera unit control unit 201 performs a restart process.

After the restart, the determination processes of steps ST11 to ST15 are performed again. As a result of the processing of step ST22, the image sensor unit 10 and the camera unit 20 each store the same correction data and determination information. Therefore, the determination conditions in the determination processes of steps ST11 to ST14 are all satisfied, and the process proceeds to step ST15.

In a case where the firmware versions do not match each other as a result of the determination process of step ST15, the process proceeds to step ST23. In step ST23, the firmware stored in the image sensor unit 10 is updated on the basis of the firmware stored in the camera unit 20. Specifically, the firmware of the image sensor unit 10 is updated with binary data held by the camera unit 20. After the update, the camera unit control unit 201 performs a restart process.

After the restart, the determination processes of steps ST11 to ST15 are performed again. As a result of the processing of step ST23, the version of the ND filter control firmware of the image sensor unit 10 matches the version of the ND filter control firmware of the camera unit 20. Therefore, the determination condition in the determination process of step ST15 is satisfied. Accordingly, the process proceeds to step ST16, and the normal start-up process is performed.

As described above, in a case where it is determined that the correction data have been updated, the camera unit control unit 201 copies the correction data stored in the nonvolatile memory 104 to the nonvolatile memory 208. Even in a case where the image sensor unit 10 is attachable to a different camera unit 20 and correction data can be updated, the camera unit 20 to which the image sensor unit 10 has been attached can confirm whether or not the correction data have been updated, by performing such processing. Furthermore, the camera unit 20 can set appropriate correction data (updated correction data) in its own hardware.

In addition, the camera unit control unit 201 stores, in the nonvolatile memory 208, the correction data stored in the nonvolatile memory 104 in a case where it is determined that the currently attached image sensor unit is different from the previously attached image sensor unit in a determination process different from the update determination process (for example, the processing of step ST12 or ST14). Accordingly, even in a case where the image sensor unit 10 different from the previously attached image sensor unit 10 is attached to the camera unit 20, the camera unit 20 can read correction data stored in the image sensor unit 10 and set the correction data in its own hardware. Furthermore, in a case where the currently attached image sensor unit 10 is the same as the previously attached image sensor unit 10, it is not necessary to copy the correction data from the nonvolatile memory 104 to the camera unit 20, so that efficient processing can be performed.

Note that in a case where the determination conditions are not satisfied in the determination processes of steps ST12, ST13, and ST14, the processing of step ST15 may be performed in step ST22. That is, in a case where the firmware versions do not match each other, a process of updating the firmware of the image sensor unit 10 with the binary data held by the camera unit 20 may be performed. As a result of performing such a process, it is not necessary to perform a restart twice in a case where the determination condition is not satisfied in any of the determination processes of steps ST12 to ST14 and the determination condition is not satisfied in the determination process of step ST15.

Note that in the processing in steps ST11 and ST12, the camera unit control unit 201 acquires the model information on the image sensor unit 10 by, for example, reading a predetermined port. Furthermore, in steps ST13 and ST14, the camera unit control unit 201 requests data corresponding to a predetermined address in the nonvolatile memory 104. Then, when the data corresponding to the address are returned, the camera unit control unit 201 acquires the serial number of the image sensor unit 10 and the data revision number of the image sensor unit. In step ST15, the camera unit control unit 201 acquires a firmware version by communicating with the image sensor unit control unit 103 of the image sensor unit 10. Of course, the present embodiment is not limited thereto, and the camera unit control unit 201 may exchange the determination information by constantly communicating with the image sensor unit control unit 103.

Figure 4:
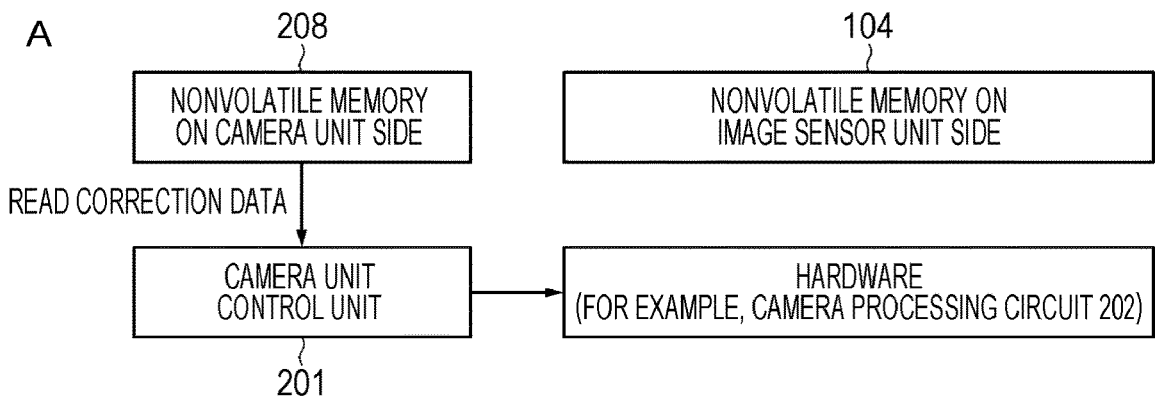
FIGS. 4A and 4B are diagrams schematically showing processing to be performed in the imaging apparatus according to the one embodiment.
Figure 4:
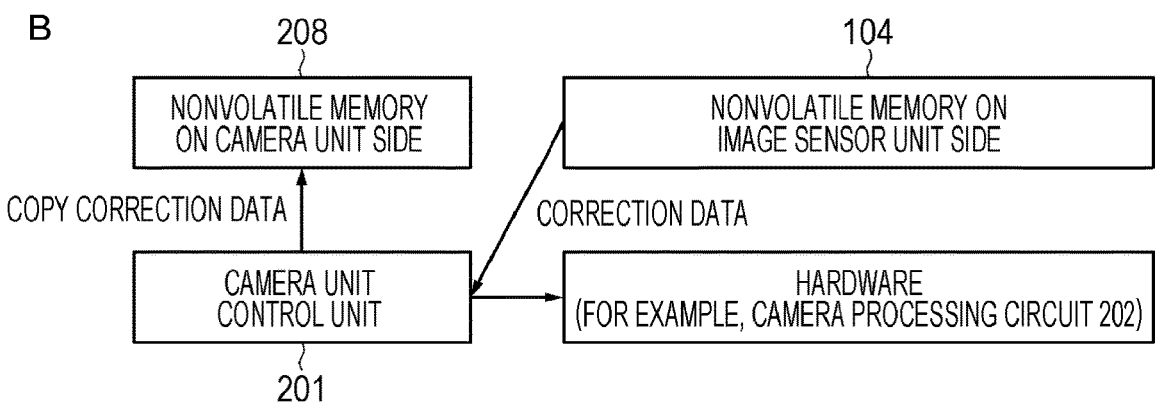

FIGS. 4A and 4B are diagrams schematically showing details of the above-described processing. FIG. 4A is a diagram schematically showing details of a normal start-up process to be performed in a case where the determination conditions in all the determination processes are satisfied. In the normal start-up process, the camera unit control unit 201 reads correction data stored in the nonvolatile memory 208 and sets the read correction data in hardware (for example, the camera processing circuit 202). Processing time can be reduced by use of correction data stored not in the nonvolatile memory 104 but in the nonvolatile memory 208 of the camera unit 20.

FIG. 4B is a diagram schematically showing details of the process of step ST22 to be performed in a case where the determination condition is not satisfied in any of the determination processes of steps ST12, ST13, and ST14. In this case, the camera unit control unit 201 reads correction data from the nonvolatile memory 104, stores (copies) the read correction data in the nonvolatile memory 208, and sets the correction data in the hardware.

Figure 5:
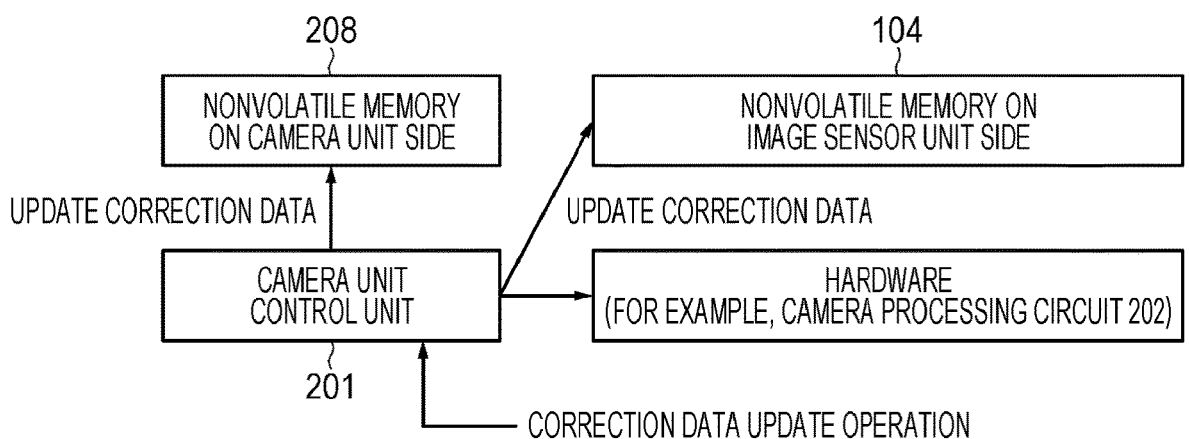
FIG. 5 is a diagram schematically showing processing to be performed in the imaging apparatus according to the one embodiment in a case where an operation of updating correction data is performed.

Note that as described above, the operation of updating the correction data is performed in a state where the image sensor unit 10 is attached to the camera unit 20. In this case, as schematically shown in FIG. 5, the camera unit control unit 201 updates the correction data stored in the nonvolatile memory 104 and the nonvolatile memory 208. Furthermore, the camera unit control unit 201 sets the updated correction data in the hardware.

2. Variations

One embodiment of the present disclosure has been specifically described above. However, the contents of the present disclosure are not limited to the embodiment described above, and various modifications based on the technical idea of the present disclosure can be made. Hereinafter, variations will be described.

In the above-described embodiment, correction data have be described as data corresponding to a plurality of types of information (for example, pixel defect information, white shading correction information, black shading correction information, and setting information regarding the ND filter 105). In addition, an example in which a single data revision number is assigned to the correction data has been described. However, the contents of the present disclosure are not limited thereto. For example, a data revision number may be assigned to each type of data included in the correction data (for example, data corresponding to the pixel defect information or data corresponding to the white shading correction information). Then, a configuration may be adopted in which a data revision number assigned to each piece of data included in the correction data is read to determine whether or not each piece of data included in the correction data has been updated. Then, only a type of data updated may be copied to the nonvolatile memory 208 instead of copying the correction data (all types of data). As a result, a processing load can be reduced.

A single data revision number may be assigned to correction data, and a data revision number may be assigned to each type of data included in the correction data. Then, only in a case where there is a change in the data revision number assigned to the correction data, the data revision number may be read for each type of data included in the correction data to determine whether or not each piece of data included in the correction data has been updated. It is not necessary to constantly read the data revision number for each type of data included in the correction data. Thus, the processing can be simplified.

In a case where a plurality of types of image sensors is applied as the image sensor 101, correction data for each type of image sensor may be stored in the nonvolatile memory 104 or the nonvolatile memory 208. Furthermore, each image sensor may include firmware.

The present disclosure can be applied not only to correction data, but also to, for example, data accompanying an application (for example, an application that generates a screen related to a user interface (UI)).

In the embodiment described above, in a case where correction data are updated on the camera unit 20 side, the camera unit 20 may read only the updatable correction data stored in the image sensor unit 10.

In the embodiment described above, in a case where the image sensor unit 10 includes a plurality of the image sensors 101 different in, for example, resolution (resolution referred to as HD, FHD, 4K, or 8K) and size, the following may be held in the nonvolatile memory 104: the number and role thereof (colors such as RGB, use for the right eye, use for the left eye, and the like) (information on these items are held for all the image sensors), an imaging frame rate corresponding to the image sensor 101 (24, 25, 30, 50, 60, 120, or 240 fps (frame per second), and the like.

In the above-described embodiment, the first storage unit has been exemplified by the nonvolatile memory 104, and the second storage unit has been exemplified by the nonvolatile memory 208. However, the first storage unit and the second storage unit are not limited thereto. For example, the first storage unit may be a storage unit in the image sensor unit control unit 103 (for example, a predetermined area of a storage unit included in the image sensor unit control unit 103, or a nonvolatile storage unit included in the image sensor unit control unit 103). Similarly, the second storage unit may be a storage unit in the camera unit control unit 201 (for example, a predetermined area of a storage unit included in the camera unit control unit 201, or a nonvolatile storage unit included in the camera unit control unit 201). Then, correction data, firmware, and other information may be stored in the storage unit in the image sensor unit control unit 103 or the storage unit in the camera unit control unit 201.

In the above-described embodiment, the correction data may be automatically updated instead of being updated by user operation (manual operation).

In the above-described embodiment, the image sensor 101 may be an image sensor including a plurality of image sensors, such as a three-plate type image sensor of red (R), green (G), and blue (B) and a two-plate type image sensor for 3D display. In that case, there may be a plurality of subsequent-stage constituent elements corresponding to the image sensors.

In the above-described embodiment, the image sensor unit 10 may include a dedicated phase difference AF sensor.

In the embodiment described above, when correction data are copied from the image sensor unit 10 to the camera unit 20, correction data on the camera unit 20 side may be overwritten with the correction data to be copied. Alternatively, the correction data on the image sensor unit 10 side may be copied while the correction data on the camera unit 20 side remain unchanged, or may be stored after the correction data on the camera unit 20 side are deleted.

In the embodiment described above, the process shown in FIG. 3 may be performed in parallel with the process for detecting whether or not the image sensor unit 10 has been attached to the camera unit 20 in terms of hardware. Furthermore, after it is detected that the image sensor unit 10 has been attached to the camera unit 20 in terms of hardware, software-based processing (for example, the process shown in FIG. 3) may be performed.

In the above-described embodiment, a configuration may be adopted in which the process may proceed to step ST16 from any stage of the process shown in FIG. 3. Thus, not all the steps are necessarily required.

The configurations described in the above embodiment are merely an example, and the present disclosure is not limited thereto. It goes without saying that additions, deletions, and the like of configurations may be made without departing from the spirit of the present disclosure.

The present disclosure can also be implemented in any form such as an apparatus, a method, a program, or a system. For example, assume that a program that fulfills the function described in the above embodiment can be downloaded. Then, an apparatus that does not have the control function described in the embodiment can perform the control described in the embodiment by downloading and installing the program. The present disclosure can also be implemented by a server that distributes such a program.

The present disclosure can also adopt the following configurations.

(1)

An imaging apparatus including:

an image sensor unit; and a camera unit from which the image sensor unit is detachable, in which the image sensor unit includes at least:

an image sensor; and a first storage unit in which first correction data are stored, the camera unit includes at least a control unit, and the control unit performs an update determination process for determining whether or not the first correction data stored in the first storage unit have been updated.

(2)

The imaging apparatus according to (1), in which the camera unit further includes a second storage unit in which second correction data are stored, and the control unit stores, in the second storage unit, the first correction data stored in the first storage unit in a case where it is determined that the first correction data have been updated.

(3)

The imaging apparatus according to (1) or (2), in which the control unit performs the update determination process in a case where it is determined that the image sensor unit currently attached is identical to an image sensor unit previously attached.

(4)

The imaging apparatus according to (2) or (3), in which the control unit stores, in the second storage unit, the correction data stored in the first storage unit in a case where it is determined that the image sensor unit currently attached is different from an image sensor unit previously attached.

(5)

The imaging apparatus according to (2) or (3), in which the control unit performs a process of determining whether or not data related to the image sensor unit, stored in the first storage unit match data related to the image sensor unit, stored in the second storage unit, and determines that the image sensor unit currently attached is different from an image sensor unit previously attached in a case where the data related to the image sensor unit do not match each other as a result of the process.

(6)

The imaging apparatus according to (5), in which the data related to the image sensor unit include:

an identifier indicating a model of the image sensor unit; and a serial number unique to the image sensor unit.

(7)

The imaging apparatus according to any one of (2) to (6), in which the control unit performs a process of determining whether or not first version information on firmware for performing predetermined control, stored in the first storage unit, matches second version information on firmware stored in the second storage unit.

(8)

The imaging apparatus according to (7), in which the control unit updates the firmware corresponding to the first version information on the basis of the firmware corresponding to the second version information in a case where the first version information and the second version information do not match each other as a result of the determination.

(9)

The imaging apparatus according to any one of (2) to (8), in which the control unit performs processing by using the correction data stored in the second storage unit in a case where the first correction data have not been updated.

(10)

The imaging apparatus according to any one of (1) to (9), in which the control unit performs the update determination process at start-up.

(11)

The imaging apparatus according to any one of (1) to (10), in which the control unit performs the update determination process in parallel with detection as to whether or not there is a physical connection between connection parts.

(12)

The imaging apparatus according to any one of (2) to (11), in which the control unit compares data representing an update history of the correction data stored in the first storage unit with data representing an update history of the correction data stored in the second storage unit, and the control unit determines that the correction data have been updated in a case where the data do not match each other, and determines that the correction data have not been updated in a case where the data do not match each other.

(13)

The imaging apparatus according to (2), in which the control unit performs a restart after storing, in the second storage unit, the correction data stored in the first storage unit.

(14)

The imaging apparatus according to any one of (2) to (13), in which in a case where an operation of changing correction data is performed on the camera unit in a state where the image sensor unit is attached to the camera unit, the control unit changes the correction data stored in each of the first storage unit included in the image sensor unit and the second storage unit.

(15)

The imaging apparatus according to any one of (1) to (14), in which the correction data are data including at least one of pixel defect information, white shading correction information, black shading correction information, or data relating to a failure of an ND filter.

(16)

The imaging apparatus according to any one of (1) to (15), further including:

a lens unit that is detachable from the image sensor unit, and includes an imaging lens.

(17)

The imaging apparatus according to (16), in which information regarding the imaging lens is supplied to the camera unit via the image sensor unit.

(18)

An image sensor unit to which a lens unit including an imaging lens can be attached in a detachable manner, the image sensor unit being attachable to and detachable from a camera unit, the image sensor unit including at least:

an image sensor; and a storage unit in which correction data are stored, in which data representing an update history of the correction data are stored in the storage unit.

(19)

A camera unit to which an image sensor unit and a lens unit can be attached in a detachable manner, the image sensor unit including at least an image sensor and a storage unit in which correction data are stored, the lens unit including an imaging lens, the lens unit being attachable to and detachable from the camera unit via the image sensor unit, the camera unit including:

a control unit that determines whether or not correction data have been updated, the correction data being stored in a storage unit included in an image sensor unit attached to the camera unit.

(20)

A control method including:

causing a control unit included in a camera unit to determine whether or not correction data have been updated, the correction data being stored in a first storage unit included in an image sensor unit attached to the camera unit, and to store the correction data in a second storage unit included in the camera unit in a case where the correction data have been updated, as a result of the determination.

3. Application Examples

The technology according to the present disclosure can be applied to various products. For example, the technology according to the present disclosure may be applied to an endoscopic surgery system.

Figure 6:
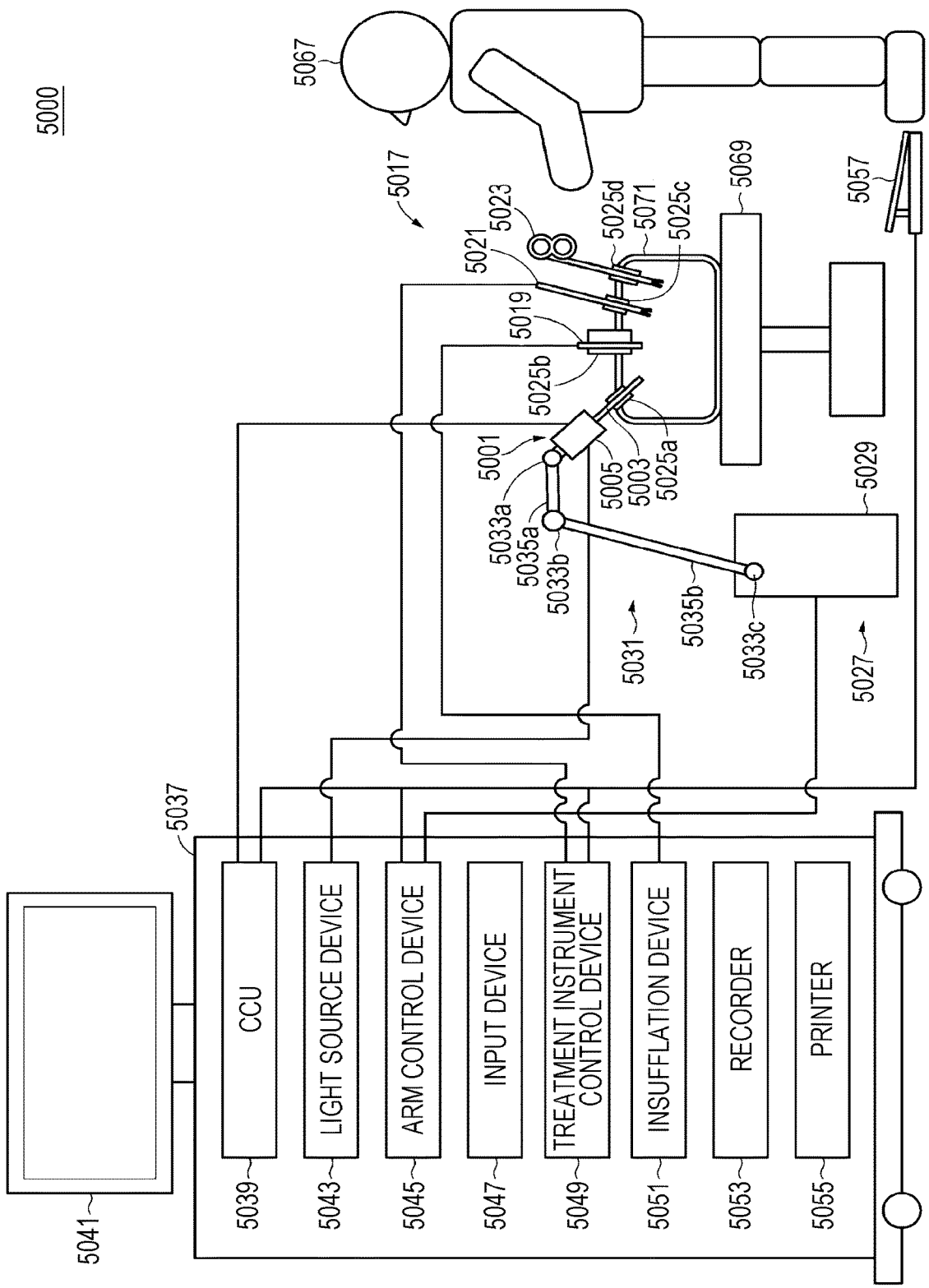
FIG. 6 is a diagram showing an example of a schematic configuration of an endoscopic surgery system.

FIG. 6 is a diagram showing an example of a schematic configuration of an endoscopic surgery system 5000 to which the technology according to the present disclosure can be applied. FIG. 6 shows an operator (surgeon) 5067 performing an operation on a patient 5071 on a patient bed 5069 by using the endoscopic surgery system 5000. As shown, the endoscopic surgery system 5000 includes an endoscope 5001, other surgical instruments 5017, a support arm device 5027, and a cart 5037. The support arm device 5027 supports the endoscope 5001. Various devices for endoscopic surgery are mounted on the cart 5037.

In endoscopic surgery, multiple tubular opening instruments called trocars 5025a to 5025d are placed through the abdominal wall, instead of cutting and opening the abdominal wall. Then, a lens barrel 5003 of the endoscope 5001 and the other surgical instruments 5017 are inserted into the body cavity of the patient 5071 through the trocars 5025a to 5025d. In the shown example, the other surgical instruments 5017 inserted in the body cavity of the patient 5071 include an insufflation tube 5019, an energy treatment instrument 5021, and forceps 5023. Furthermore, the energy treatment instrument 5021 is a treatment instrument for performing incision and ablation of tissue, sealing of blood vessels, or the like by using high-frequency current and ultrasonic vibration. However, the surgical instruments 5017 shown in the drawing are merely examples, and various surgical instruments to be generally used in endoscopic surgery, such as forceps and a retractor, for example, may be used as the surgical instruments 5017.

An image of an operative site in the body cavity of the patient 5071 captured by the endoscope 5001 is displayed on a display device 5041. The operator 5067 provides treatment such as excision of an affected part, for example, by using the energy treatment instrument 5021 and the forceps 5023 while viewing the image of the operative site displayed on the display device 5041 in real time. Note that although not shown, the insufflation tube 5019, the energy treatment instrument 5021, and the forceps 5023 are supported by the operator 5067, an assistant, or the like during the operation.

(Support Arm Device)

The support arm device 5027 includes an arm 5031 extending from a base 5029. In the shown example, the arm 5031 includes joints 5033*a*, 5033*b*, and 5033*c*, and links 5035*a* and 5035*b*. The arm 5031 is driven under the control of an arm control device 5045. The arm 5031 supports the endoscope 5001, and controls the position and orientation thereof. Therefore, it is possible to stably fix the position of the endoscope 5001.

(Endoscope)

The endoscope 5001 includes the lens barrel 5003 and a camera head 5005. A part of the lens barrel 5003 is inserted into the body cavity of the patient 5071. The part extends to a predetermined length from the distal end of the lens barrel 5003. The camera head 5005 is connected to the proximal end of the lens barrel 5003. In the shown example, the endoscope 5001 is configured as a so-called rigid scope including the lens barrel 5003 that is rigid. However, the endoscope 5001 may be configured as a so-called flexible scope including the lens barrel 5003 that is flexible.

An opening with an objective lens fitted therein is provided at the distal end of the lens barrel 5003. A light source device 5043 is connected to the endoscope 5001. Light generated by the light source device 5043 is guided to the distal end of the lens barrel by a light guide extending inside the lens barrel 5003, and is emitted toward an observation target in the body cavity of the patient 5071 through the objective lens. Note that the endoscope 5001 may be a forward-viewing endoscope, an oblique-viewing endoscope, or a side-viewing endoscope.

An optical system and an imaging element are provided inside the camera head 5005. Reflected light (observation light) from the observation target is condensed on the imaging element by the optical system. The imaging element performs photoelectric conversion of the observation light to generate an electric signal corresponding to the observation light, that is, an image signal corresponding to an observation image. The image signal is transmitted as RAW data to a camera control unit (CCU) 5039. Note that the camera head 5005 has the function of adjusting magnification and focal length by appropriately driving the optical system.

Note that the camera head 5005 may include a plurality of imaging elements so as to be applicable to, for example, stereoscopic viewing (3D display) or the like. In this case, a plurality of relay optical systems is provided inside the lens barrel 5003 so as to guide observation light to each of the plurality of imaging elements.

(Various Devices to be Mounted on Cart)

The CCU 5039 includes a central processing unit (CPU), a graphics processing unit (GPU), and the like, and centrally controls the operation of the endoscope 5001 and the display device 5041. Specifically, the CCU 5039 performs, on the image signal received from the camera head 5005, various types of image processing such as, for example, development processing (demosaicing processing) for displaying an image based on the image signal. The CCU 5039 provides the image signal subjected to the image processing to the display device 5041. Furthermore, the CCU 5039 transmits a control signal to camera head 5005 to control the driving thereof. The control signal may include information regarding imaging conditions such as a magnification and a focal length.

The display device 5041 displays an image based on the image signal subjected to the image processing performed by the CCU 5039, under the control of the CCU 5039. In a case where the endoscope 5001 is applicable to imaging at high resolution such as 4K (3,840 horizontal pixels×2,160 vertical pixels) or 8K (7,680 horizontal pixels×4,320 vertical pixels), for example, and/or is applicable to 3D display, a display device corresponding thereto, that is, a display device that can provide high-resolution display and/or 3D display may be used as the display device 5041. In a case where the endoscope 5001 is applicable to imaging at high resolution such as 4K or 8K, a display device with a size of 55 inches or more can be used as the display device 5041 to bring more sense of immersion. Furthermore, a plurality of the display devices 5041 different in resolution and size may be provided depending on the intended use.

The light source device 5043 includes a light source such as a light emitting diode (LED), for example, and supplies the endoscope 5001 with irradiation light to be used for capturing an image of the operative site.

The arm control device 5045 includes a processor such as a CPU, for example, and operates according to a predetermined program to control the driving of the arm 5031 of the support arm device 5027 in accordance with a predetermined control method.

An input device 5047 is an input interface with the endoscopic surgery system 5000. A user can input various types of information and instructions to the endoscopic surgery system 5000 via the input device 5047. For example, the user inputs, via the input device 5047, various types of information related to surgery, such as physical information on a patient and information about an operative method. Furthermore, for example, the user inputs, via the input device 5047, an instruction to the effect that the arm 5031 should be driven, an instruction to the effect that imaging conditions (type of irradiation light, magnification, focal length, and the like) for imaging by the endoscope 5001 should be changed, an instruction to the effect that the energy treatment instrument 5021 should be driven, or other instructions.

The type of the input device 5047 is not limited, and various publicly known input devices may be used as the input device 5047. For example, a mouse, a keyboard, a touch panel, a switch, a foot switch 5057, and/or a lever can be applied as the input device 5047. In a case where a touch panel is used as the input device 5047, the touch panel may be provided on a display surface of the display device 5041.

Alternatively, the input device 5047 is a device to be worn by a user, such as a spectacle-type wearable device or a head mounted display (HMD), for example. Various inputs are made in accordance with a user's gesture or line-of-sight detected by these devices. Furthermore, the input device 5047 includes a camera capable of detecting the movement of the user. Thus, various inputs are made in accordance with a user's gesture or line-of-sight detected from a screen image captured by the camera. Moreover, the input device 5047 includes a microphone capable of collecting a user's voice, and various inputs are made by voice via the microphone. As described above, the input device 5047 is configured such that various types of information can be input in a non-contact manner. This particularly enables a user belonging to a clean area (for example, the operator 5067) to operate a device belonging to an unclean area in a non-contact manner. In addition, the user can operate the device without releasing his/her grip on the surgical instrument. This improves user convenience.

A treatment instrument control device 5049 controls the driving of the energy treatment instrument 5021 for cauterizing or incising tissue, sealing blood vessels, or the like. An insufflation device 5051 insufflate gas into the body cavity of the patient 5071 through the insufflation tube 5019 so as to inflate the body cavity for the purpose of securing the visual field of the endoscope 5001 and securing working space for the operator. A recorder 5053 is a device that can record various types of information related to surgery. A printer 5055 is a device capable of printing various types of information related to surgery in various formats such as text, images, and graphs.

Hereinafter, a particularly characteristic configuration of the endoscopic surgery system 5000 will be described in more detail.

(Support Arm Device)

The support arm device 5027 includes the base 5029 as a base, and the arm 5031 extending from the base 5029. In the shown example, the arm 5031 includes a plurality of the joints 5033a, 5033b, and 5033c, and a plurality of the links 5035a and 5035b connected by the joint 5033b. However, for the sake of simplicity, FIG. 6 shows a simplified configuration of the arm 5031. Actually, for example, the shape, number, and arrangement of the joints 5033a to 5033c and the links 5035a and 5035b, and the directions of the rotation axes of the joints 5033a to 5033c are appropriately set such that the arm 5031 has a desired degree of freedom. For example, the arm 5031 can be suitably configured such that the arm 5031 has six or more degrees of freedom. Accordingly, the endoscope 5001 can be freely moved within the range of movement of the arm 5031. Thus, the lens barrel 5003 of the endoscope 5001 can be inserted into the body cavity of the patient 5071 from a desired direction.

The joints 5033a to 5033c are each provided with an actuator. The joints 5033a to 5033c are each configured to be rotatable around a predetermined rotation axis by being driven by the actuator. The driving of the actuators is controlled by the arm control device 5045. As a result, the rotation angle of each of the joints 5033a to 5033c is controlled, and the driving of the arm 5031 is controlled. This can achieve control of the position and orientation of the endoscope 5001. At this time, the arm control device 5045 can control the driving of the arm 5031 by various publicly known control methods such as force control and position control.

For example, the driving of the arm 5031 may be appropriately controlled by the arm control device 5045 in accordance with an operation input by the operator 5067 via the input device 5047 (including the foot switch 5057) as appropriate such that the position and orientation of the endoscope 5001 is controlled. With this control, after the endoscope 5001 at the distal end of the arm 5031 is moved from any given position to a desired position, the endoscope 5001 can be fixedly supported at the position to which the endoscope 5001 has been moved. Note that the arm 5031 may be operated by the so-called master-slave method. In this case, the arm 5031 can be remotely controlled by a user via the input device 5047 installed at a location away from an operating room.

Furthermore, in a case where the force control is applied, the arm control device 5045 may perform so-called power assist control to drive the actuator of each of the joints 5033a to 5033c such that the arm 5031 is subjected to external force from a user and smoothly moves according to the external force. Accordingly, when the user moves the arm 5031 while directly touching the arm 5031, the user can move the arm 5031 with a relatively small force. Therefore, the endoscope 5001 can be moved more intuitively and with a simpler operation. Thus, user convenience can be improved.

Here, generally, the endoscope 5001 has been supported by a physician called an endoscopist in the endoscopic surgery. In contrast, use of the support arm device 5027 enables the position of the endoscope 5001 to be more reliably fixed without manual operation, so that an image of the operative site can be stably obtained. Thus, the operation can be performed smoothly.

Note that the arm control device 5045 need not necessarily be provided on the cart 5037. Furthermore, the arm control device 5045 need not necessarily be a single device. For example, the arm control device 5045 may be provided at each of the joints 5033a to 5033c of the arm 5031 of the support arm device 5027 such that a plurality of the arm control devices 5045 cooperates with each other to control the driving of the arm 5031.

(Light Source Device)

The light source device 5043 supplies the endoscope 5001 with irradiation light at the time of imaging an operative site. The light source device 5043 includes a white light source including, for example, an LED, a laser light source, or a combination thereof. At this time, in a case where the white light source includes a combination of RGB laser light sources, output intensity and output timing can be controlled for each color (each wavelength) with high precision. Thus, the white balance of a captured image can be adjusted in the light source device 5043. Furthermore, in this case, it is also possible to capture respective images corresponding to RGB in a time-division manner by irradiating an observation target with laser light from each of the RGB laser light sources in a time-division manner and controlling the driving of the imaging element of the camera head 5005 in synchronization with the timing of irradiation. According to this method, a color image can be obtained even in a case where no color filter is provided in the imaging element.

Furthermore, the driving of the light source device 5043 may be controlled such that the intensity of light to be output is changed at predetermined time intervals. While the driving of the imaging element of the camera head 5005 is controlled in synchronization with the timing of changing light intensity, images are obtained in a time-division manner and then combined. As a result, it is possible to generate a high dynamic range image without so-called blocked up shadows or blown out highlights.

Furthermore, the light source device 5043 may be configured such that the light source device 5043 can supply light in a predetermined wavelength band corresponding to special light observation. In special light observation, so-called narrow band imaging is performed in which a predetermined tissue such as a blood vessel in the superficial layer of mucous membrane is imaged with high contrast while being irradiated with light in a band narrower than that of irradiation light to be used in normal observation (that is, white light), by use of, for example, the wavelength dependence of light absorption in body tissue. Alternatively, in special light observation, fluorescence observation may be performed in which an image is obtained by fluorescence generated by excitation light irradiation. For example, the following is performed in fluorescence observation. A body tissue is irradiated with excitation light to observe fluorescence from the body tissue (autofluorescence observation). Alternatively, a reagent such as indocyanine green (ICG) is locally injected into a body tissue and the body tissue is irradiated with excitation light corresponding to the fluorescence wavelength of the reagent to obtain a fluorescent image. The light source device 5043 can be configured such that the light source device 5043 can supply narrowband light and/or excitation light applicable to such special light observation.

(Camera Head and CCU)

Figure 7:
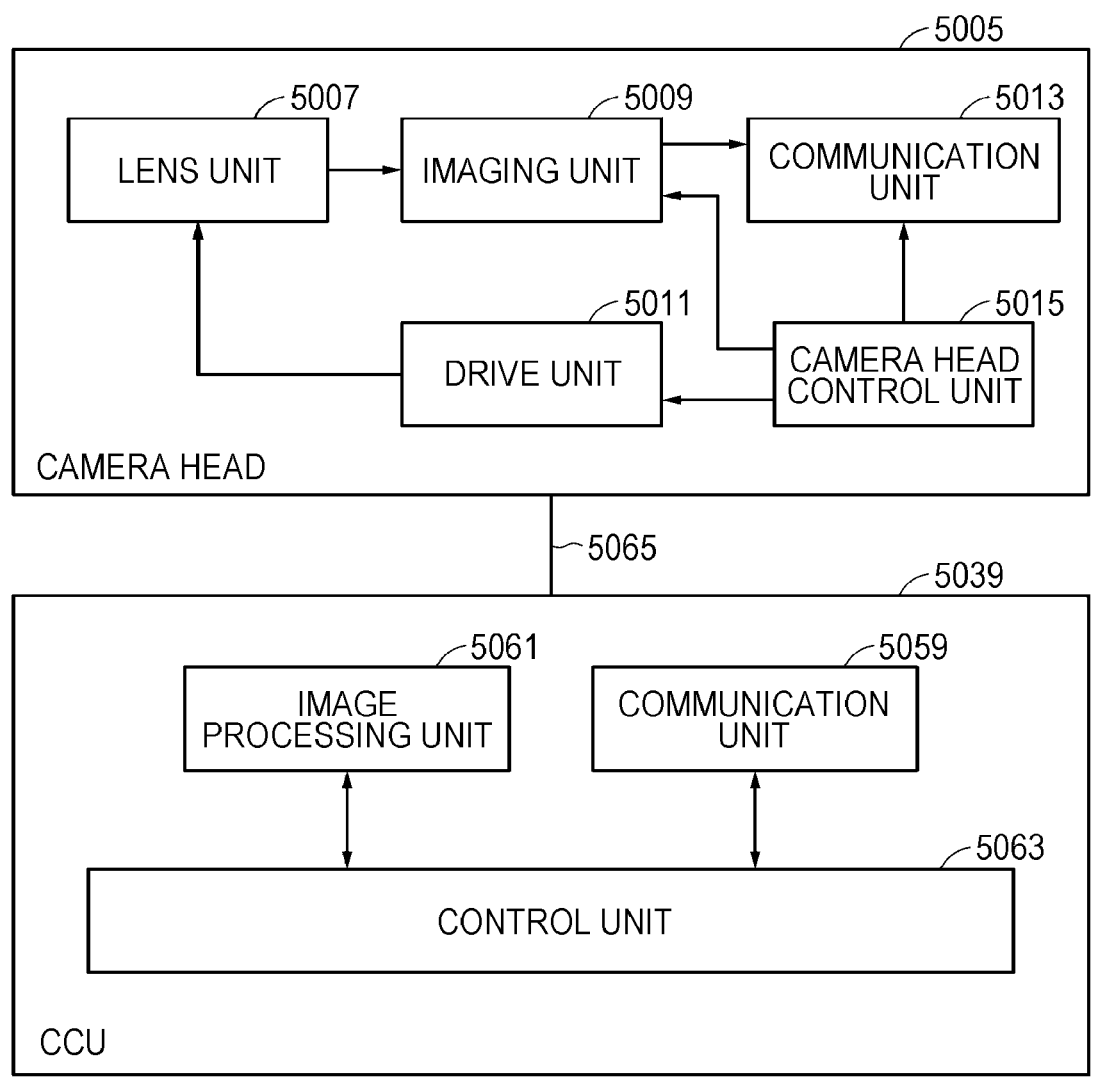
FIG. 7 is a block diagram showing examples of functional configurations of a camera head and a CCU shown in FIG. 6.

Functions of the camera head 5005 and the CCU 5039 of the endoscope 5001 will be described in more detail with reference to FIG. 7. FIG. 7 is a block diagram showing examples of functional configurations of the camera head 5005 and the CCU 5039 shown in FIG. 6.

Referring to FIG. 7, the camera head 5005 includes, as its functional units, a lens unit 5007, an imaging unit 5009, a drive unit 5011, a communication unit 5013, and a camera head control unit 5015. Furthermore, the CCU 5039 includes, as its functional units, a communication unit 5059, an image processing unit 5061, and a control unit 5063. The camera head 5005 and the CCU 5039 are connected by a transmission cable 5065 in such a way as to enable bidirectional communication between the camera head 5005 and the CCU 5039.

First, the functional configuration of the camera head 5005 will be described. The lens unit 5007 is an optical system provided at a connection part between the camera head 5005 and the lens barrel 5003. Observation light taken in from the distal end of the lens barrel 5003 is guided to the camera head 5005 and enters the lens unit 5007. The lens unit 5007 includes a combination of a plurality of lenses including a zoom lens and a focus lens. The optical characteristics of the lens unit 5007 have been adjusted such that observation light is condensed on the light receiving surface of the imaging element of the imaging unit 5009. Furthermore, the zoom lens and the focus lens are configured such that the positions thereof on the optical axis can be changed so as to adjust the magnification and focus of an image to be captured.

The imaging unit 5009 includes an imaging element, and is disposed at a stage subsequent to the lens unit 5007. The observation light that has passed through the lens unit 5007 is condensed on the light receiving surface of the imaging element, so that an image signal corresponding to an observation image is generated by photoelectric conversion. The image signal generated by the imaging unit 5009 is provided to the communication unit 5013.

For example, a complementary metal oxide semiconductor (CMOS) type image sensor that has a Bayer array and can capture a color image is used as the imaging element to be included in the imaging unit 5009. Note that an imaging element applicable to the capturing of an image at high resolution of, for example, 4K or more may be used as the imaging element. As a result of obtaining an image of an operative site at high resolution, the operator 5067 can grasp the state of the operative site in more detail, and can proceed with the operation more smoothly.

In addition, the imaging element included in the imaging unit 5009 includes a pair of imaging elements for respectively obtaining right-eye and left-eye image signals corresponding to 3D display. As a result of providing the 3D display, the operator 5067 can more accurately grasp the depth of living tissue at the operative site. Note that in a case where the imaging unit 5009 is configured as a multi-plate type imaging unit, a plurality of the lens units 5007 is provided such that the lens units 5007 correspond to respective imaging elements.

Furthermore, the imaging unit 5009 need not necessarily be provided in the camera head 5005. For example, the imaging unit 5009 may be provided inside the lens barrel 5003 immediately after the objective lens.

The drive unit 5011 includes an actuator, and causes the zoom lens and the focus lens of the lens unit 5007 to move a predetermined distance along the optical axis under the control of the camera head control unit 5015. As a result, the magnification and focus of an image to be captured by the imaging unit 5009 can be appropriately adjusted.

The communication unit 5013 includes a communication device for transmitting and receiving various types of information to and from the CCU 5039. The communication unit 5013 transmits, as RAW data, the image signal obtained from the imaging unit 5009 to the CCU 5039 via the transmission cable 5065. At this time, it is preferable that the image signal be transmitted by optical communication so as to display a captured image of the operative site with low latency. This is because during surgery, the operator 5067 performs an operation while observing the state of an affected part on the basis of a captured image. Therefore, a moving image of the operative site is required to be displayed in real time as far as possible for a safer and more reliable operation. In a case where optical communication is performed, the communication unit 5013 is provided with a photoelectric conversion module that converts an electric signal into an optical signal. The image signal is converted into an optical signal by the photoelectric conversion module, and then transmitted to the CCU 5039 via the transmission cable 5065.

Furthermore, the communication unit 5013 receives, from the CCU 5039, a control signal for controlling the driving of the camera head 5005. The control signal includes information regarding imaging conditions, such as information to the effect that the frame rate of images to be captured has been specified, information to the effect that an exposure value for imaging has been specified, and/or information to the effect that the magnification and focus of an image to be captured have been specified, for example. The communication unit 5013 provides the received control signal to the camera head control unit 5015. Note that the control signal from the CCU 5039 may also be transmitted by optical communication. In this case, the communication unit 5013 is provided with a photoelectric conversion module that converts an optical signal into an electric signal. The control signal is converted into an electric signal by the photoelectric conversion module, and is then provided to the camera head control unit 5015.

Note that the above-described imaging conditions such as a frame rate, an exposure value, a magnification, and a focus are automatically set by the control unit 5063 of the CCU 5039 on the basis of the obtained image signals. That is, the endoscope 5001 is equipped with a so-called auto-exposure (AE) function, an autofocus (AF) function, and an auto white balance (AWB) function.

The camera head control unit 5015 controls the driving of the camera head 5005 on the basis of the control signal received from the CCU 5039 via the communication unit 5013. For example, the camera head control unit 5015 controls the driving of the imaging element of the imaging unit 5009 on the basis of the information to the effect that the frame rate of images to be captured has been specified and/or the information to the effect that exposure for imaging has been specified. In addition, for example, the camera head control unit 5015 appropriately causes the zoom lens and the focus lens of the lens unit 5007 to be moved via the drive unit 5011 on the basis of the information to the effect that the magnification and focus of an image to be captured have been specified. The camera head control unit 5015 may further have the function of storing information for identifying the lens barrel 5003 and the camera head 5005.

Note that it is possible to cause the camera head 5005 to have resistance to autoclave sterilization by arranging constituent elements such as the lens unit 5007 and the imaging unit 5009 in a hermetically sealed structure with high airtightness and waterproofness.

Next, the functional configuration of the CCU 5039 will be described. The communication unit 5059 includes a communication device for transmitting and receiving various types of information to and from the camera head 5005. The communication unit 5059 receives an image signal transmitted from the camera head 5005 via the transmission cable 5065. At this time, as described above, the image signal can be suitably transmitted by optical communication. In this case, the communication unit 5059 is provided with a photoelectric conversion module that converts an optical signal into an electric signal so as to be applicable to optical communication. The communication unit 5059 provides the image signal converted to an electric signal to the image processing unit 5061.

Furthermore, the communication unit 5059 transmits, to the camera head 5005, a control signal for controlling the driving of the camera head 5005. The control signal may also be transmitted by optical communication.

The image processing unit 5061 performs various types of image processing on the image signal as RAW data transmitted from the camera head 5005. Examples of the image processing include various types of publicly known signal processing such as development processing, image quality enhancing processing (band emphasis processing, super-resolution processing, noise reduction (NR) processing, camera shake correction processing, and/or the like), and enlargement processing (electronic zoom processing), for example. Furthermore, the image processing unit 5061 performs detection processing on the image signal, for performing AE, AF, and AWB.

The image processing unit 5061 includes processors such as a CPU and a GPU. The processors operate according to predetermined programs. As a result, the above-described image processing and detection processing can be performed. Note that in a case where the image processing unit 5061 includes a plurality of GPUs, the image processing unit 5061 divides information related to the image signal as appropriate, and causes the plurality of GPUs to perform image processing in parallel.

The control unit 5063 performs various types of control related to the imaging of the operative site by the endoscope 5001 and display of a captured image thereof. For example, the control unit 5063 generates a control signal for controlling the driving of the camera head 5005. At this time, in a case where imaging conditions have been input by the user, the control unit 5063 generates a control signal on the basis of the input by the user. Alternatively, in a case where the endoscope 5001 is equipped with the AE function, the AF function, and the AWB function, the control unit 5063 generates a control signal by appropriately calculating an optimal exposure value, focal length, and white balance in accordance with the result of the detection processing by the image processing unit 5061.

Furthermore, the control unit 5063 causes the display device 5041 to display an image of the operative site on the basis of the image signal on which the image processing has been performed by the image processing unit 5061. At this time, the control unit 5063 recognizes various objects in the image of the operative site by using various image recognition techniques. The control unit 5063 can recognize, for example, surgical instruments such as forceps, a specific region of a living body, bleeding, mist generated when the energy treatment instrument 5021 is used, and the like, by detecting the shape, color, and the like of an edge of an object included in the image of the operative site. When causing the display device 5041 to display the image of the operative site, the control unit 5063 causes various types of operation support information to be superimposed and displayed on the image of the operative site by using the results of recognition. The operation support information is superimposed and displayed to be presented to the operator 5067. As a result, it is possible to proceed with the operation more safely and reliably.

The transmission cable 5065 connecting the camera head 5005 and the CCU 5039 is an electric signal cable applicable to electric signal communication, an optical fiber applicable to optical communication, or a composite cable thereof.

Here, although wire communication is performed by use of the transmission cable 5065 in the shown example, communication between the camera head 5005 and the CCU 5039 may be performed in a wireless manner. In a case where the communication therebetween is performed in a wireless manner, it is not necessary to lay the transmission cable 5065 in the operating room, so that it is possible to solve the situation in which the movement of medical staff members in the operating room is hindered by the transmission cable 5065.

An example of the endoscopic surgery system 5000 to which the technology according to the present disclosure can be applied has been described above. Note that although the endoscopic surgery system 5000 has been described as an example here, a system to which the technology according to the present disclosure can be applied is not limited to such an example. For example, the technology according to the present disclosure may be applied to an inspection flexible endoscope system or a microscopic surgery system.

The technology according to the present disclosure can be suitably applied to the camera head 5005 and the CCU 5039 among the constituent elements described above. Specifically, the technology according to the present disclosure is used in a start-up process at the time of establishing connection between the camera head 5005 and the CCU 5039. For example, the present disclosure can be applied to a system that can perform processing in which a correction value is used for each camera head, by causing the CCU 5039 to read correction information on the camera head stored in a nonvolatile memory in the camera head 5005 (not shown) or a nonvolatile memory in the camera head control unit.

More specifically, in a case where the camera head 5005 is provided with a plurality of imaging elements so as to be applicable to stereoscopic viewing (3D display) and the like, the amount of deviation of each imaging element with respect to the optical axis, and the like are stored in the camera head, so that the CCU 5039 adjusts an image by using information on the amount of deviation such that the image becomes suitable for stereoscopic viewing. However, the amount of deviation may change due to a mechanical shock to the camera head 5005. Even in such a case, it is possible to provide suitable stereoscopic display by allowing a user to manually make correction while checking an output image or to use the function of automatically detecting and correcting the amount of deviation. As a result of storing the newly corrected amount of deviation in the camera head 5005, it is possible to make correction based on the corrected amount of deviation also at the time of connecting to another CCU 5039. It is possible to determine whether or not correction data have been updated, on the main body side of the imaging apparatus by applying the present disclosure to such a system. This can reduce the amount of time required for a start-up process, so that a burden on an operator or assistant can be reduced. Of course, the example described above is merely an example, and the present disclosure is not limited thereto. Similar processing may also be performed on correction data other than the amount of deviation.

REFERENCE SIGNS LIST

1 Imaging apparatus
10 Image sensor unit
20 Camera unit
101 Image sensor
103 Image sensor unit control unit
104 Nonvolatile memory
105 ND filter
201 Camera unit control unit
208 Nonvolatile memory

The invention claimed is:

1. An imaging apparatus, comprising:
an image sensor unit; and
a camera unit from which the image sensor unit is detachable,
wherein the image sensor unit includes at least:
an image sensor; and
a first memory in which first correction data, different from firmware information, are stored, wherein the first correction data include at least one of pixel defect information, white shading correction information, and black shading correction information, wherein a revision number of the first correction data is stored in the first memory, the revision number being a number of times that the first correction data stored in the first memory have been updated from an original version, the revision number being incremented by one each time the first correction data is updated, and being independent of a firmware version number,
the camera unit includes a second memory in which second correction data are stored, and control circuitry, wherein the second correction data include at least one of the pixel defect information, the white shading information, and the black shading information, and
the control circuitry is configured to perform an update determination process to determine, based on the stored revision number, whether or not the first correction data stored in the first memory of the image sensor unit have been updated by a previous user operation via the camera unit and are thus different from the second correction data stored in the second memory, and store, in the second memory, the first correction data stored in the first memory when it is determined that the first correction data have been updated by the previous user operation.

2. The imaging apparatus according to claim 1, wherein the control circuitry is further configured to perform the update determination process when it is determined that the image sensor unit currently attached is identical to an image sensor unit previously attached.

3. The imaging apparatus according to claim 1, wherein the control circuitry is further configured to store, in the second memory, the first correction data stored in the first memory when it is determined that the image sensor unit currently attached is different from an image sensor unit previously attached.

4. The imaging apparatus according to claim 1, wherein the control circuitry is further configured to perform a process of determining whether or not first data related to the image sensor unit, stored in the first memory, match second data related to the image sensor unit, stored in the second memory, and determine that the image sensor unit currently attached is different from an image sensor unit previously attached when the first and second data do not match each other as a result of the process.

5. The imaging apparatus according to claim 3, wherein the first data related to the image sensor unit are different from the fuiiiware information and include:
an identifier indicating a model of the image sensor unit; and
a serial number unique to the image sensor unit.

6. The imaging apparatus according to claim 1, wherein the control circuitry is further configured to perform a process of determining whether or not first version information on firmware for performing predetermined control, stored in the first memory, matches second version information on firmware stored in the second memory.

7. The imaging apparatus according to claim 6, wherein the control circuitry is further configured to update the firmware corresponding to the first version information based on the firmware corresponding to the second version information when the first version information and the second version information do not match each other as a result of the determination.

8. The imaging apparatus according to claim 1, wherein the control circuitry is further configured to perform processing by using the second correction data stored in the second memory when the first correction data have not been updated.

9. The imaging apparatus according to claim 1, wherein the control circuitry is further configured to perform the update determination process at start-up.

10. The imaging apparatus according to claim 1, wherein the control circuitry is further configured to perform the update determination process in parallel with detection as to whether or not there is a physical connection between connection parts.

11. The imaging apparatus according to claim 1, wherein the control circuitry is further configured to compare the revision number of the first correction data stored in the first memory with another revision number of the second correction data stored in the second memory, and the control circuitry is further configured to determine that the first correction data have been updated when the revision number does not match the another revision number, and
the another revision number indicates a number of times the second correction data has been updated.

12. The imaging apparatus according to claim 1, wherein the control circuitry is further configured to perform a restart after storing, in the second memory, the first correction data stored in the first memory.

13. The imaging apparatus according to claim 1, wherein when an operation of changing the second correction data is performed on the camera unit in a state where the image sensor unit is attached to the camera unit, the control circuitry is further configured to change the first and second correction data respectively stored in each of the first memory included in the image sensor unit and the second memory.

14. An image sensor unit to which a lens unit including an imaging lens can be attached in a detachable manner, the image sensor unit being attachable to and detachable from a camera unit, the image sensor unit comprising:
an image sensor; and
a memory in which correction data, different from firmware information, are stored, wherein the correction data include at least one of pixel defect information, white shading correction information, and black shading correction information, wherein a revision number of the correction data is stored in the memory, the revision number being a number of times that the correction data stored in the memory have been updated from an original version, the revision number being incremented by one each time the correction data is updated, and being independent of a firmware version number.

15. The imaging apparatus according to claim 1, further comprising:

a lens unit that is detachable from the image sensor unit, the lens unit including an imaging lens.

16. The imaging apparatus according to claim 15, wherein information regarding the imaging lens is supplied to the camera unit via the image sensor unit.

17. The imaging apparatus according to claim 14, wherein the first correction data includes information for forcibly turning off use of a neural density (ND) filter when a failure occurs in a filter disk device that switches insertion of the ND filter.

18. A camera unit to which an image sensor unit and a lens unit can be attached in a detachable manner, the image sensor unit including at least an image sensor and a first memory in which first correction data are stored, the first correction data include at least one of pixel defect information, white shading correction information, and black shading correction information, the lens unit including an imaging lens, the lens unit being attachable to and detachable from the camera unit via the image sensor unit, the camera unit comprising:

a second memory in which second correction data are stored, wherein the second correction data include at least one of the pixel defect information, the white shading information, and the black shading information, wherein a revision number of the second correction data is stored in the second memory, the revision number being a number of times that the second correction data stored in the second memory have been updated from an original version, the revision number being incremented by one each time the second correction data is updated, and being independent of a firmware version number; and control circuitry configured to determine, based on the stored revision number, whether or not the first correction data, different from firmware information, have been updated by a previous user operation via the camera unit and are thus different from the second correction data stored in the second memory, and store, in the second memory, the first correction data stored in the first memory when it is determined that the first correction data have been updated by the previous user operation, the first correction data being stored in the first memory included in the image sensor unit attached to the camera unit.

19. A control method, comprising:

causing control circuitry included in a camera unit to determine, based on a stored revision number, whether or not first correction data, different from firmware information, have been updated by a user operation via the camera unit and are thus different from second correction data stored in a second memory included in the camera unit, the first correction data include at least one of pixel defect information, white shading correction information, and black shading correction information, the first correction data being stored in a first memory included in an image sensor unit attached to the camera unit, and store the first correction data in the second memory included in the camera unit when the first correction data are determined to have been updated, wherein the revision number of the first correction data is stored in the first memory, the revision number being a number of times that the first correction data stored in the first memory have been updated from an original version, the revision number being incremented by one each time the first correction data is updated, and being independent of a firmware version number, wherein the second correction data include at least one of the pixel defect information, the white shading information, and the black shading information.

* * * * *